United States Patent
Hovestadt et al.

(10) Patent No.: US 7,822,538 B2
(45) Date of Patent: Oct. 26, 2010

(54) SYSTEM FOR COMMUNICATING TRAFFIC DATA

(75) Inventors: Guido Hovestadt, Wickede (DE); Ralph Behrens, Schellerten (DE); Grit Behrens, Schellerten (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 793 days.

(21) Appl. No.: 10/912,867

(22) Filed: Aug. 6, 2004

(65) Prior Publication Data

US 2005/0107944 A1 May 19, 2005

(30) Foreign Application Priority Data

Aug. 8, 2003 (EP) .................................. 03017602

(51) Int. Cl.
*G01C 21/26* (2006.01)
(52) U.S. Cl. .................................. 701/200; 340/995.13
(58) Field of Classification Search ......... 701/200–202, 701/23–27, 117–119, 208, 213; 342/357.06, 342/357.09, 357.1, 357.12; 340/988, 995.13
See application file for complete search history.

(56) References Cited

U.S. PATENT DOCUMENTS

| | | | | |
|---|---|---|---|---|
| 5,164,904 A | * | 11/1992 | Sumner | 701/117 |
| 6,058,390 A | * | 5/2000 | Liaw et al. | 707/2 |
| 6,594,576 B2 | * | 7/2003 | Fan et al. | 701/117 |
| 6,862,524 B1 | * | 3/2005 | Nagda et al. | 701/209 |
| 6,990,401 B2 | * | 1/2006 | Neiss et al. | 701/96 |

FOREIGN PATENT DOCUMENTS

| | | |
|---|---|---|
| DE | 197 01 370 A | 7/1997 |
| DE | 199 33 638 A | 1/2001 |
| EP | 0 697 686 A | 2/1996 |
| EP | 1 045 224 A | 10/2000 |

OTHER PUBLICATIONS

European Patent Office Search Report regarding Application No. EP 03 01 7602, dated Jan. 15, 2004, 8 pages.

* cited by examiner

*Primary Examiner*—Yonel Beaulieu

(57) ABSTRACT

A system that communicates traffic data to a vehicle is presented. The system generally includes a method that communicates traffic data to an operator of the vehicle. The system provides location data to a computer-based system, and allocates attribute data to a subset of the location data. The allocation may be initiated by the operator. The traffic data is processed by the computer-based system, and/or communicated to the operator. The system may further include a device that provides traffic data to the operator. The traffic data device generally includes a locator for providing location data, an allocator for allocating attribute data to a subset of the location data, a storage medium for storing the generated traffic data, and an output device.

51 Claims, 7 Drawing Sheets

SYSTEM FOR COMMUNICATING TRAFFIC DATA

PRIORITY CLAIM

This application claims priority to European Patent Application 03017602.8, filed Aug. 8, 2003. The disclosure of the above application is incorporated herein by reference.

BACKGROUND OF THE INVENTION

1. Technical Field

The invention relates to a system, such as a navigation system, for communicating traffic data to an operator of a vehicle.

2. Related Art

Some vehicles are equipped with a navigation system. A task of a navigation system includes determining the position of the vehicle, calculating an optimal route to a destination specified by the vehicle operator, and providing route guidance to ("routing") the vehicle operator. For example, if the navigation system is installed in a car, the navigation system may indicate onto which direction or street to turn.

Navigation systems may include a system for processing data, and a device for determining the position of the moving vehicle that uses information from a positioning system. Digital map data relating to the road system of an area, such as that of a country, is stored on a storage medium, and may be used by the navigation system for determining a route to a final destination. Based on data relating to the position of the vehicle (the "position date"), and the route determined by the system, instructions relating to routing are communicated to the operator. The navigation system may perform routing based on actual traffic conditions. Traffic data, such as that relating to one-way streets, and turn-off restrictions may be stored with the digital map data. Such data may be regularly updated by the data supplier to provide up-to-date traffic data for navigation purposes.

Navigation systems may receive current traffic information from external information stations via a radio. The radio may have a Radio Data System function (an "RDS function") in communication with a Traffic Message Channel ("TMC") channel to receive traffic information. The traffic information may be received from, for example, a Short Message Service ("SMS"), or a General Packet Radio System ("GPRS"). The GPRS may use a Global System for Mobile Communication ("GSM") unit, or a comparable wireless connection.

The traffic data provided to the navigation systems is limited by the data provided by the supplier. Therefore, information that may be of interest to a particular operator may not be available and there may not be enough memory to store such information if it were available. Furthermore, when the traffic data is received by a RDS/TMC function (which may have been encoded according to the international Standard "Alert-C-Protocol"), the data transmission capacity may be restricted to about 320 to about 430 traffic announcements per minute.

SUMMARY

A system that communicates traffic data to a vehicle is presented. The system generally includes a method that communicates traffic data to an operator of the vehicle. The method provides location data to a computer-based system, and allocates attribute data to a subset of the location data. The allocation may be initiated by the operator. The traffic data may be processed by the computer-based system, and/or communicated to the operator.

The system may further include a device that provides traffic data to the operator. The traffic data device generally includes a locator for providing location data, an allocator for allocating attribute data a subset of the location data, a storage medium for storing the generated traffic data, and an output device.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
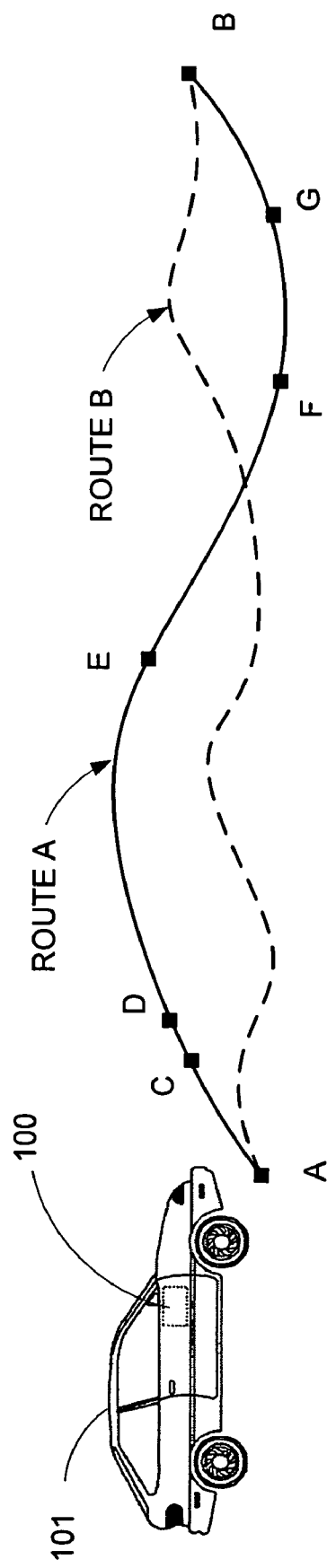
FIG. 1 is a diagram of a vehicle traversing a distance.

A system is presented that enables the operator of a vehicle to specify and edit the information in a computer-based system, such as a navigation system, so that traffic data is generated and communicated to the operator based on data relating to location and attributes according to the operator's preferences. The attribute data may include information relating to current traffic and/or, environmental conditions that are of significance to the operator, and that may not be available from conventional information suppliers or provided by RDS/TMC or other services. For example, information important to the operator that may not be provided by conventional sources may relate to small streets frequented by the operator on the operator's daily commute to work. Therefore, traveling may be optimized in terms of security, health, comfort, time and cost as specified by the operator.

The term "operator" includes not only the operator of a vehicle, but anyone else that may use the system. In addition, the operator that inputs an attribute may or may not be the same operator as the operator to whom the traffic data generated based on that attribute is communicated. The term "attribute" includes information or types of information that may be relevant to an individual operator or a group of operators, such as data relating to traffic. For example, the group of operators may have a common interest, such as a common interest resulting from traveling frequently within the same area, or sharing a hobby.

Attributes may be allocated or related to a specific location, route or area, and may include varying amounts of attribute data. Therefore, allocated attribute data may include information related to a specific location. The location may be represented by a location datum or multiple location data that represent a street, an area or the like. In other words, the location may be represented by a location attribute. Attribute data may be allocated to location data by an operator according to the operator's preferences. In addition, allocation of the attribute data may continue automatically, for example using software, and may, for example, depend on data relating to the position of the vehicle. Automatic allocation may be initiated in relation to a sensor measurement. Such allocation may allow facts and information relating to a location, a route or an area, which are of interest for the individual operator, to be considered when, for example, determining a route.

Attribute data may be generated by an operator, who may input information relating to the attribute into the system. The operator may define an attribute according to the operator's impressions, perceptions or preferences. The attribute data may be detected by the operator, for example during a trip with the vehicle. The operator may directly detect attribute data using the operator's sense organs, such as by seeing, smelling and hearing. The operator may indirectly detect attribute data indirectly using a sensor, or from external information sources, such as newspapers, television broadcasts, radio broadcasts, other operators, and other sources. Alternatively or additionally, the attribute data may be selected from a list of attributes stored in a storage device accessible by the system. The stored data may be extended and updated by the operator. Therefore, traffic events or circumstances that have not previously been identified as significant to the operator may be considered.

The system may include software that allows attribute data to be received and allocated to location data. The software may provide an interface for the operator, such as a graphical user interface ("GUI") or menu. Therefore, the computer-based system may be configured so that attribute input and allocation may be easily performed. In addition, the attribute data and/or the traffic data may be extracted 'online' or 'offline' and may be made available to any other operator, or group, such as to a service provider.

The term "attribute" is not restricted to features, information or circumstances that describe the movement of a vehicle and the circumstances surrounding that movement. "Attribute" may refer to any feature or information relating, for example, to a street, a route or an area that might be of significance to an individual operator. Accordingly, information such as street crime, street lightning, pollen count, environmental aesthetics, vistas or outlooks along a certain street or route may also represent attributes. As a result, information which may not be included in databases and which may not be considered to represent traffic information, may be utilized, for example, for navigation purposes.

The attribute data detected by the operator may include driving data, which may have been identified during a previous trip traversing the same, or part of the same, distance. When traversing the same distance, the detected driving data may be utilized, such as, to determine an optimized route.

The driving data may include data relating to the drive time or the fuel consumption of the vehicle. Data relating to drive time may include the time of the day and/or the duration of the trip. Further, driving data may include the number of times the operator actuates the gas pedal or the brake pedal, the number of times the steering wheel is turned greater than a predetermined angle, or the time spent waiting due to traffic lights. Thereby, driving data that influence the comfort of the operator during the drive may be detected and utilized for navigation purposes.

The driving data may be detected using a variety of sensors that are in communication with the vehicle. These sensors may measure time, vehicle direction, vehicle velocity, temperature, humidity, light intensity, fuel level, vehicle acceleration and/or deceleration. The sensor may include light sensing devices, including digital or analog cameras or scanners.

The operator may initiate detection of attribute data, such as driving data, by initiating a sensor by starting the engine of the vehicle. Because the sensor may be in communication with the computer-based system, the driving data detected by the sensor may be automatically communicated with the system, if, for example, such communication was previously specified by the operator. Furthermore, the attribute data may be automatically allocated to location data by software accessible to the vehicle's or navigation system's computer.

Traffic information may be entered into the system by the operator using a voice input and/or keyboard entry. If detected by a sensor, the attribute data may be entered into the system. Therefore, the operator may detect, input and allocate the attribute data by simply initiating a sensor.

The system may include a navigation system or a computer installed in the vehicle. However, the computer-based system is not necessarily located inside the vehicle. Alternatively, the computer-based system may be located on an external server to which the operator is connected via the internet using a telematic system located in the vehicle and having a wireless data interface, such as GSM.

The location data provided in the system may be selected from a storage device containing digital or analog map data of an area including the route of the vehicle. Therefore, it is possible to generate the traffic data after the trip. For example, the traffic data may be generated at the operator's home by inputting the attribute into the system and selecting the location data corresponding to the location of the attribute from the digital map data of the area stored, for example, on a CD-ROM. The quantity of location data available may depend on the resolution of the respective map and/or the respective storage medium.

The location data may be derived from data relating to the position of the vehicle as detected by a position detection device, such as a GPS unit with a receiver for receiving GPS signals. In this case, the position data of the vehicle may be allocated automatically to the traffic information when the traffic information is entered by the operator. Software stored in the computer-based system or commands inputted by the operator may initialize such automatic allocation, and no additional sources of location data, may be required.

The traffic data may be communicated to the operator by a display and/or one or more speakers. In addition, the traffic data may be communicated automatically to the operator in response to a predetermined GPS signal as the vehicle approaches the location with which the attribute is allocated. The communicated traffic data may include a warning to the operator regarding obstacles, such as pot-holes, road construction, or the like, within a predetermined distance from the vehicle. The traffic data may be used to generate other traffic data in response to the operator's input. For example, upon entering traffic data, the navigation system may determine an optimized route to the destination based on the traffic data (the further traffic data). The system may then communicate the route (the further traffic data) to the operator. For example, the route may be communicated to the operator on a display presenting a map of an area that includes traffic events such as speed limits, building sites, and the like.

Because additional information, which may be important to the individual operator, is provided, route determination and routing may be improved. Furthermore, because the system may warn an operator about approaching obstacles, driving safety may also be improved. In addition, the traffic data used for navigation purposes may be updated without significant delay.

The operator may select an attribute or a combination of attributes for navigation purposes according to the operator's preferences and/or criteria. The operator may assign a weighting factor to the traffic information, for example, relating to the importance of the traffic data according to the operator's preference. Furthermore, the operator may enter and assign additional information to the generated traffic data, such as a time period during which the traffic information is valid (valid time) or an indication that the traffic data is generated by the user (operator). This information maybe communicated with the traffic data to the operator. As a result, routing and/or calculation of a route and/or warnings may be optimized according to the operator's criterion, which may include drive time, fuel consumption, areas to avoid, absence of pollen count, presence of lights, and the like. The traffic data generated by the operator or the attribute detected by the operator may be transmitted to a second operator or an external traffic station using, for example a GSM-module in a telematic system with the respective location data.

The traffic data generated by the operator may be transmitted as a dataset of traffic data to any other operator. The dataset of traffic data may be transmitted and/or stored on a server accessible by multiple users via a network such as the Internet. The operator that receives the traffic data may then edit the traffic data.

FIG. 1 shows an example of a vehicle 101 is traversing a distance from a starting point A to destination point B. The distance from starting point A to destination point B may be traversed using differing routes A and B. Routes A and B may each include number of roads going in different directions.

Figure 7:
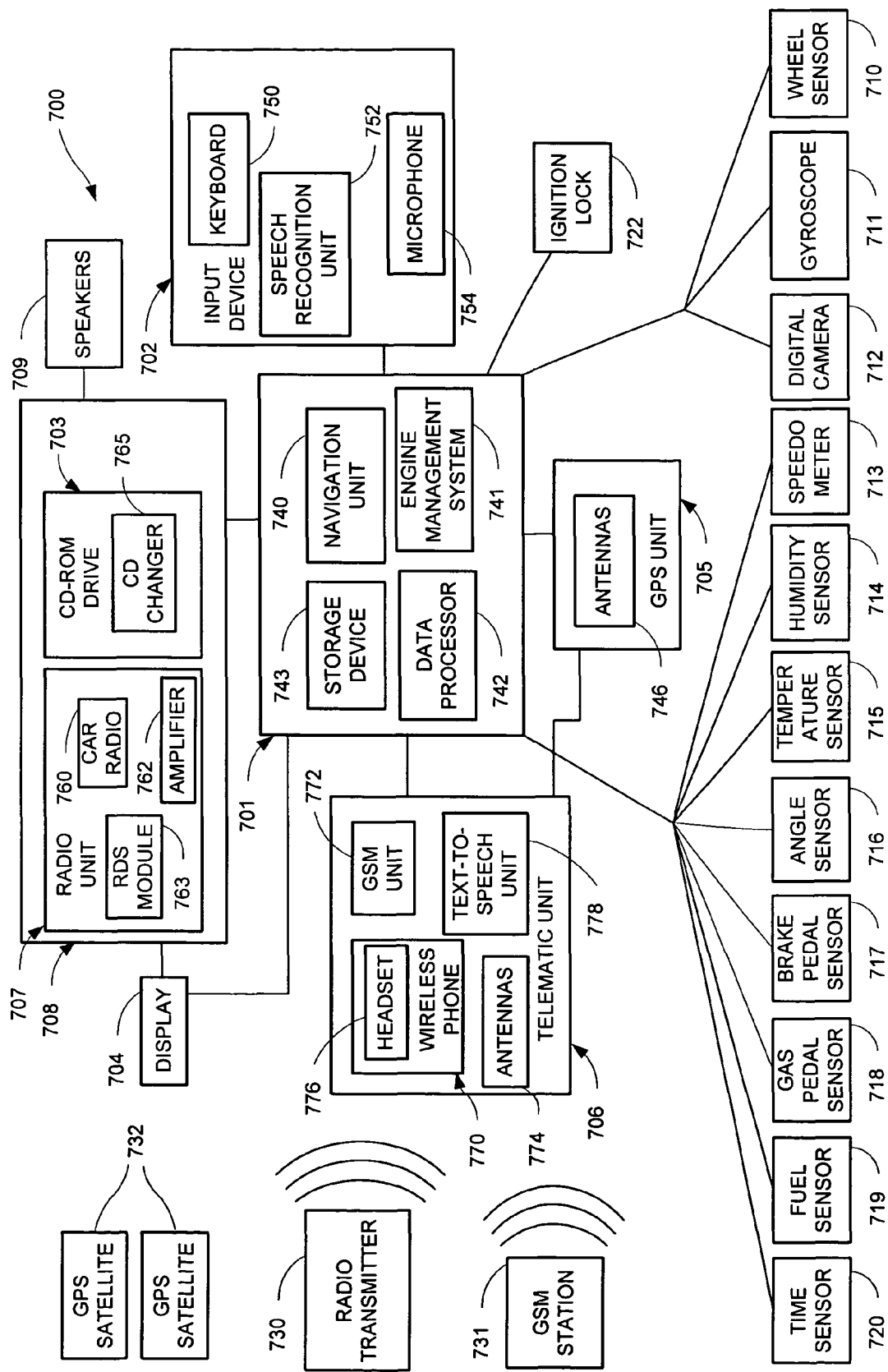
FIG. 7 is a block diagram of a system for providing traffic data to a vehicle.

The vehicle 101 includes a computer-based system 100 for providing traffic data to an operator of the vehicle 101. An example of such a system is shown in FIG. 7. As shown in FIG. 7, the system 700 may include a GPS unit 705, which may be in communication with the vehicle 101 and may include antennas 746 that both transmit and receive. The antennas 746 may receive GPS signals from GPS satellites 732 and may be in communication with a computer 701, such as that of the vehicle 101. The GPS unit 705 may further include a GPS receiver (not shown) that receives GPS signals from the antennas 746 at predetermined time intervals. The computer 701 may then calculate the position of the vehicle 101 from the received GPS signals. The computer 701 may also use data obtained from a wheel sensor 710 that measures the rotational speed of the vehicle's wheels, and a gyroscope 711. Both the wheel sensor 710 and the gyroscope 711 may be in communication with the computer 701. Therefore, data relating to the position of the vehicle 101 may be continuously determined by the GPS unit 705 and stored in a storage device 743 of the computer 701 as location data relating to a particular area.

Figure 2:
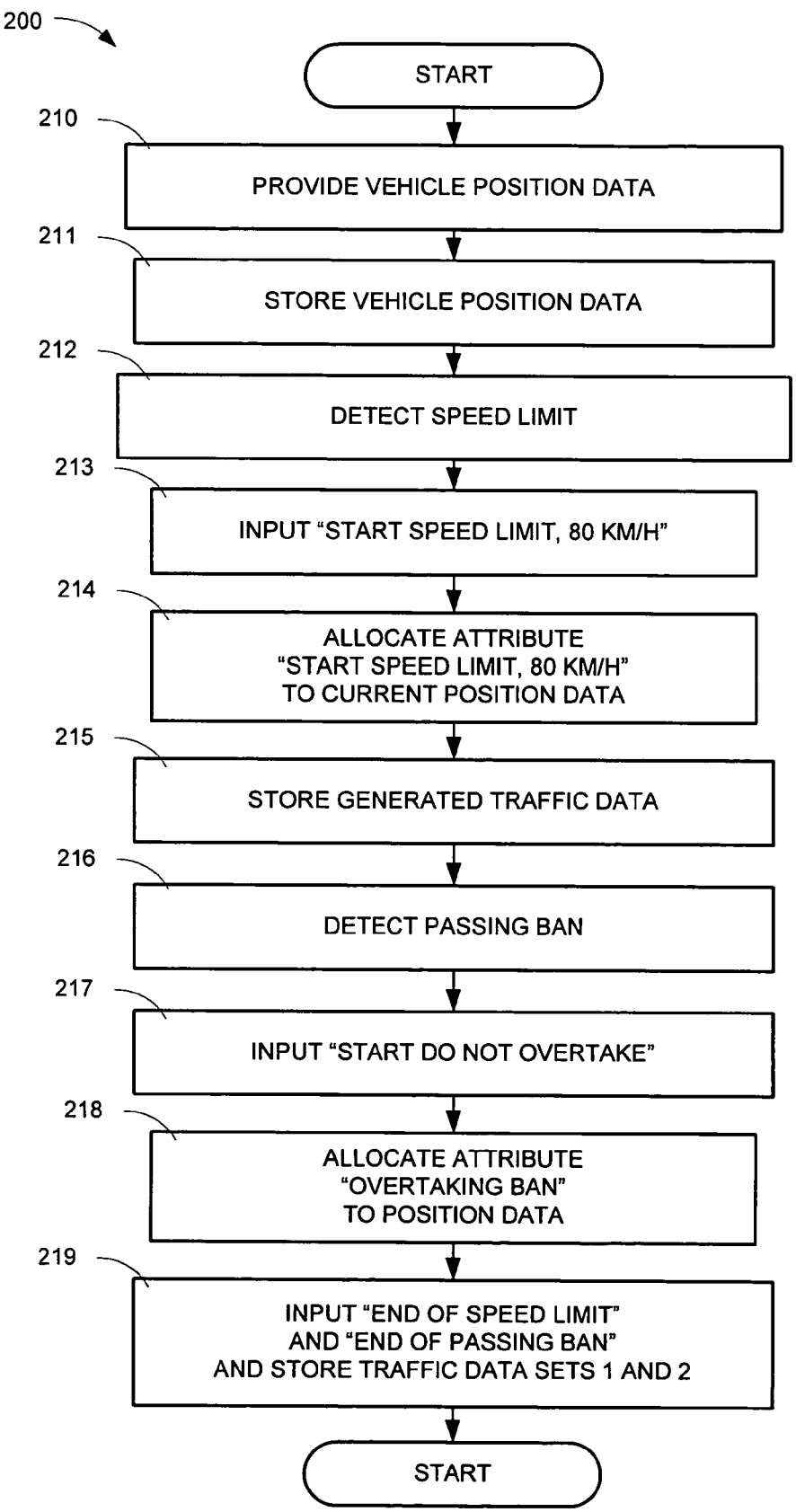
FIG. 2 is a flow chart of a method for generating traffic data for the vehicle shown in FIG. 1.

An example of a method for generating traffic data by an operator is shown in FIG. 2. The method 200 will be described with reference made to FIGS. 1 and 7, as well as FIG. 2. In the method for generating traffic data 200, data relating to the position of the vehicle is provided 210, and stored 211 in a storage device (see 743 FIG. 7). The position data may be provided and stored continuously as described above. Thereafter, a speed limit may be detected 212 at point C of FIG. 1. The speed limit may be detected by the operator's visual perception of road signs. The operator may enter information such as, "START SPEED LIMIT, 80 KM/H" 213 into the computer-based system by using an input device (see 702 FIG. 7). Entering this attribute may be facilitated by menu-driven software installed in the computer 701 and displaying menu options relating to different attributes such as road condition, speed limit, building site, and the like, as well as using peripheral menu items, such as start of a distance measurement, end of a distance measurement, and the like. It is possible for the operator to select an attribute stored in the storage device 743 (see FIG. 7) from a menu, or generate the attribute data if the desired attribute is not yet stored in the storage device 743 (see FIG. 7).

After the operator inputs "START SPEED LIMIT, 80 KM/H" 213, the data processor 742 of the computer 701 (see FIG. 7), which may continuously monitor the position data of the vehicle, allocates the attribute "SPEED LIMIT 80 KM/H" to the currently detected position (location) data 214 and stores the resulting traffic data 215 in a storage device 743 of the computer 701 (see FIG. 7). Thus traffic data may contain a "speed limit" attribute and the location data to which it is attributed. The location data may relate to a road section, and may be determined at multiple of locations (for example, as the sum of the respective location data) traversed by the vehicle as detected by a locator, such as a GPS unit 705 that is monitored by the system 700 (see FIG. 7).

Located at point D (see FIG. 1), is a road sign that states "NO PASSING." Therefore, when the vehicle reaches point D, the operator detects the passing restriction 216 by visual perception. The operator may then input an entry such as, "START DO NOT OVERTAKE" 217 into the computer by an input device 702 (see FIG 7). The passing restriction attribute may then be allocated to the current location data 218, which may be continuously or periodically detected during travel by the data processor 742 (see FIG. 7). The resulting traffic data may be stored in a storage device 743 (see FIG. 7).

Road signs that read "END OF SPEED LIMIT" and "END OF NO PASSING," are located at point E (see FIG. 1), and represent the location at which the speed limit and the passing restriction, respectively, end. Therefore, when the vehicle reaches point E, the operator may visually detect the end of the speed limit and passing restriction. The operator may then input the "END OF SPEED LIMIT" and "END OF NO PASSING" attributes into the system and the computer may store the generated traffic data set 1 relating to the attribute "SPEED LIMIT" in memory. The computer 701 (see FIG. 7) may also store the generated traffic data set 2 relating to the attribute "NO PASSING" 219 together with the corresponding location data detected during the time period between steps 213 and 219, and 217 and 219, respectively. Accordingly, traffic data set 1 may include the location data relating to the road segment located between point C and point E, and data relating to the speed limit attribute. Traffic data set 2 may include the location data relating to the road segment located between point D and point E, and data relating to the passing restriction attribute.

Alternatively, instead of entering the speed limit in step 214, the operator may input only "start of speed limit." Furthermore, the operator may enter a command, such as "start of speed measurement," without specifying the value of speed limit. In this case, data generated by a tachometer or other speed sensor may automatically be continuously allocated to the position (location) data of the vehicle in step 214.

Figure 3:
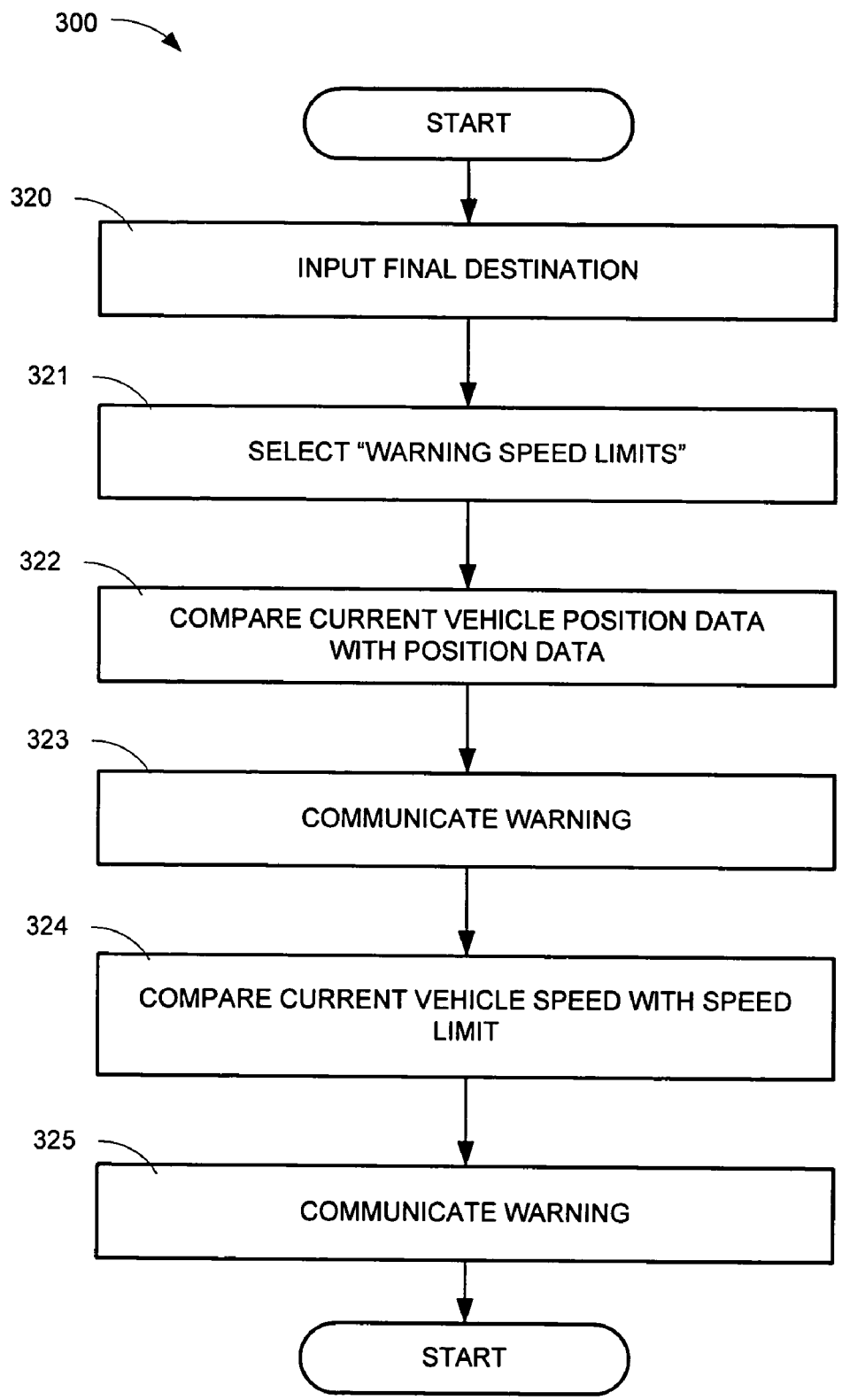
FIG. 3 is a flow chart of a method for communicating traffic data to the vehicle shown in FIG. 1.

An example of a method for communicating traffic data to the operator is shown in FIG. 3. This example will refer to FIGS. 1, 2, and 7, as well as FIG. 3. In this example, it is assumed that traffic data has been previously generated, for example using the method of FIG. 2, and that the next time the operator traverses the distance from starting point A to destination point B, the operator inputs the destination point B into the system 320. In addition, the operator selects a menu option "AUTOMATICALLY WARNING AGAINST SPEED LIMITS" 321 from the computer 701 (see FIG. 7) of the vehicle 101 (see FIG. 1). Thereafter, the data processor 742 of the computer 701 (see FIG. 7) may continuously compare the current position of the vehicle to the position data detected in step 214 (see FIG. 2). If the system determines that the vehicle approaches point C (see FIG. 1) within a predetermined distance, a warning may be communicated 325 automatically, for example on a display 704 of the vehicle and/or by an audio output, "ATTENTION, SPEED LIMIT 80 KM/H."

The data processor 742 (see FIG. 7) may continuously compare data relating to the current speed of the vehicle, as determined for example from signals received from the tachometer or other speed sensors, to the speed limit 324 of 80 km/h. If the data processor 742 determines that the vehicle traveling at speeds greater than 80 km/h, a further warning 325 may be automatically communicated to the operator, for example using audio output, such as "SPEED LIMIT 80 KM/H, PLEASE REDUCE SPEED."

Traffic data sets 1 and 2 generated by the operator may be stored in the storage device 743 in communication with the computer 701 (see FIG. 7) as traffic data sets relating to respective location data (for example, data relating to a particular location between points A and B if FIG. 1) and/or as traffic data sets relating to the respective attribute, such as in the present case, the speed limit. The generated traffic data sets 1 and 2 may be transmitted, for example, to a server that is accessible to multiple operators via a network, such as the Internet, or to any other operator. In addition, the generated traffic data sets may be loaded as a data set into another system, such as the navigation system of another vehicle. Furthermore, the traffic data sets may be edited by assigning further data, such as data relating to a time period during which the data is valid, to the attribute. For example, a speed limit that applies to a particular section of road only for a limited time period may be accounted for in this manner. Additionally, the operator may label the generated traffic data as user-generated. Such indications may be communicated to the operator to indicate that the detected traffic data is generated by an operator and, thus does not represent information supplied by a commercial database supplier or a broadcasting station.

Figure 4:
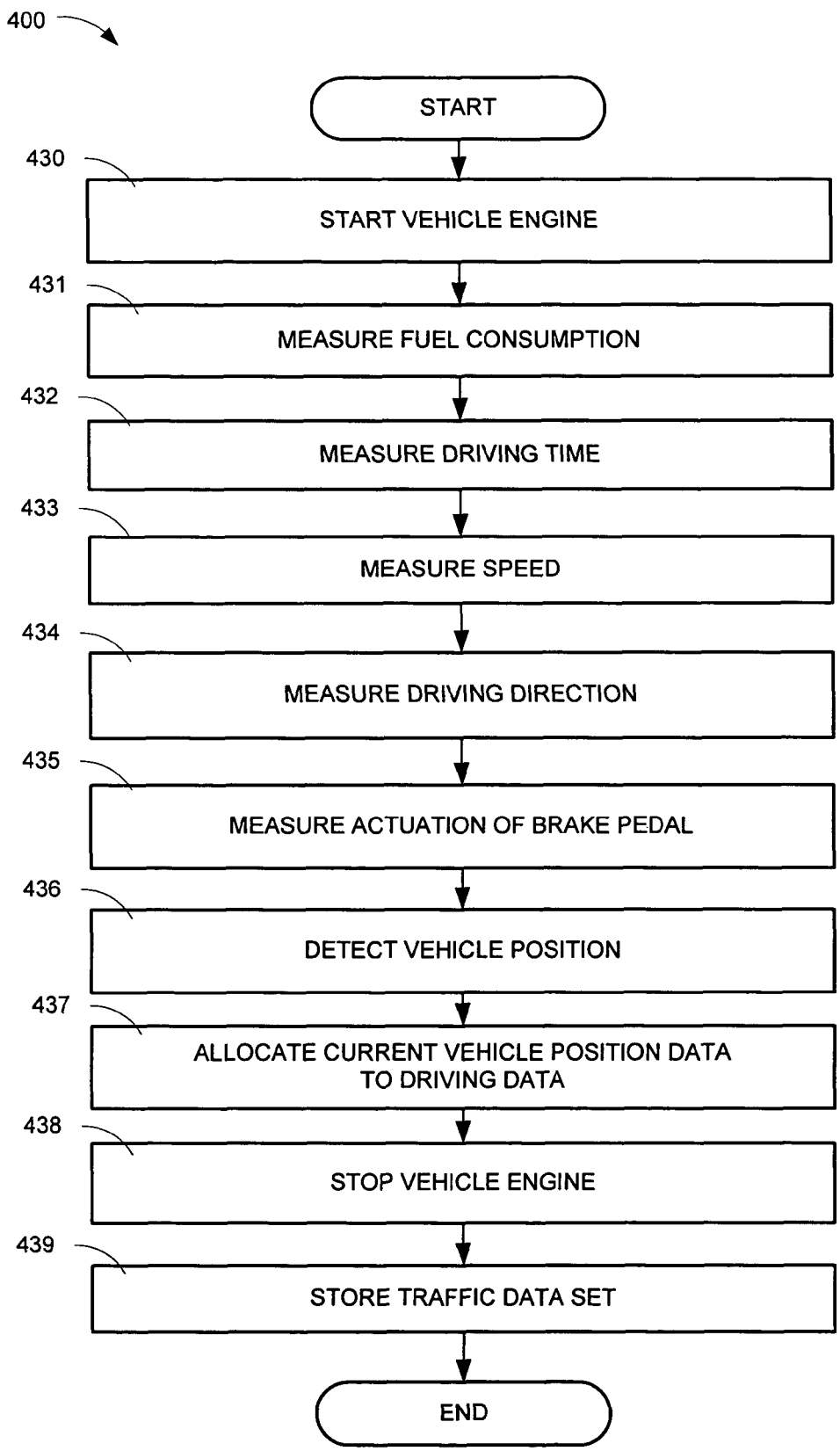
FIG. 4 is a flow chart of another method for generating traffic data for the vehicle shown in FIG. 1.

FIG. 4 shows another example of a system for generating traffic data by an operator. This example will be discussed with reference to FIGS. 1 and 7, in addition to FIG. 4. In this example, an attribute—driving data—detected by sensors in communication with the vehicle 101 (see FIG. 1). These sensors may be manually started, or automatically started by starting the engine of the vehicle 430. The sensors may be used to measure the vehicle's fuel consumption 431, drive time step 432, speed 433, driving direction or change of driving direction 434, and brake pedal actuation 435. These measurements may be performed in any order, including simultaneously and at any time. The sensors may be automatically started by the operator before driving from starting point A to destination point B (see FIG. 1) in the morning, for example, at 9:00 a.m. Examples of sensors that may be used for such measurements are shown in FIG. 7 and indicated by reference numbers 710 through 720. The detection of driving data is not restricted to the measurements shown in FIG. 4 or to the sensors shown in FIG. 7 and any driving data measured by sensors may be utilized for the generation of traffic data.

Referring to FIG. 4, while the vehicle traverses the distance between point A and point B (see FIG. 1), data relating to the current position of the vehicle may be detected 436 continuously and allocated to the driving data 437 detected by the sensor measurements in steps 431-435. Upon arrival at final destination point B (see FIG. 1), the operator may stop the vehicle engine 438, which may automatically discontinue the sensor measurements started in steps 431-435. In response to the engine stopping, the generated traffic data set 1 may be stored in the storage device 743 of the computer 701 (see FIG. 7). The generated traffic data set 1 may include the following attributes: fuel consumption, time of driving, driving duration, velocity, change of driving direction, and number of brake pedal actuations, relating to traversing the distance from starting point A to the destination point B according to route A.

After traversing the distance between point A and point B along route A (see FIG. 1), and generating and storing the traffic data set 1 according to the method of FIG. 4, the operator again seeks to traverse the distance between points A and B. However, this trip (the second drive) is started at 9:00 a.m. in the morning, and the operator chooses route B. During the second drive, steps 431 through 435 are performed again to produce a traffic data set 2. Traffic data set 2, may include data relating to fuel consumption, time, velocity, change of driving direction, and number of brake pedal actuations, relating to route B, and is stored in the storage device 743 of the computer 701 (see FIG. 7). Accordingly, traffic data set 2 includes the same types of attributes (fuel consumption, day/night time, drive time, velocity, change of driving direction and number of brake pedal actuations) as traffic data set 1, but as relating to route B instead of route A.

Thereafter, the operator is driving a third time from starting point A to the destination point B (third drive). For this third drive, the operator chooses to drive along route A, in the evening at 9:00 p.m. after the rush hour. During the third drive, steps 431 through 439 are performed, and a traffic data set 3 is generated and stored in the storage device 743 of the computer 701 (see FIG. 7). Accordingly, traffic data set 3 includes the same types of attributes as data sets 1 and 2, and corresponding to the location data of data set 1. However, the drive time is related to the evening.

Figure 5:
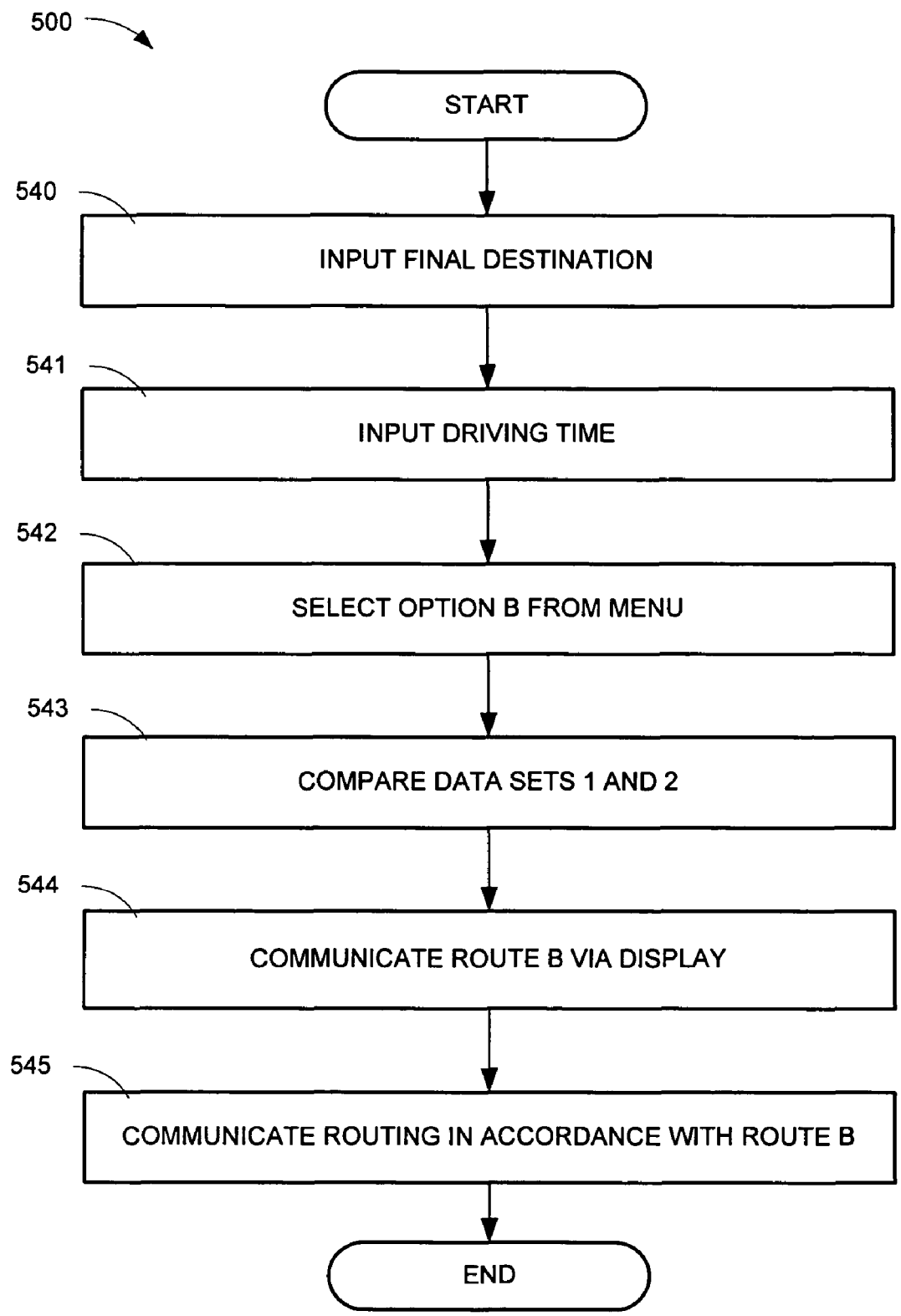
FIG. 5 is a flow chart of another method for communicating traffic data to the vehicle shown in FIG. 1.

Another example of a method for communicating traffic data to the operator is shown in FIG. 5. This example will be explained with reference to FIGS. 1, 4, and 7, as well as FIG. 5. In this example, it is assumed that traffic data sets 1 through 3 have been generated as discussed in connection with FIG. 4. In this example, the operator wishes to drive from starting point A to the destination point B (see FIG. 1) on a fourth drive. The operator inputs the final destination "B" 540 and the desired drive time of "8:30 a.m." into the computer 701 (see FIG. 7). Next, a prompt may be displayed on a display 704 of the system 700, such as "Calculation of route in accordance with Option A: drive time, Option B: fuel consumption, Option C: comfort of driving, Option D: any combination of options A/B/C." The operator may, for example, select option B 542.

The computer may then compare data sets 1 and 2 (which include data relating to the morning) 543 in terms of which route requires the least amount of fuel. If the computer determines that route B corresponds to lower fuel consumption, the computer will communicate route B, perhaps together with a street map of the area including starting point A, destination point B, and route B on the display 704 of the system 700 (see FIG. 7). Thereafter, routing information corresponding to route B may be communicated to the operator 545. The routing may be performed by a navigation unit 740 of the computer 700, and may be communicated on the display 704 and by voice output according to conventional routing methods (see FIG. 7).

If, however, the operator selects option C "comfort of driving" in step 542, the computer will determine and communicate the route exhibiting a higher comfort level for the operator. The comfort level associated with routes A and B may be determined during the first, second, and third drives by software and based on weighting factors. These weighing factors adjust the influence of different attributes relating to the comfort of driving, such as, actuation of brake pedal, numbers of changes of directions, number and length of time period during which the vehicle is not moving (such as when waiting at traffic lights). The weighting factor may be assigned by the operator. For example, in response to a prompt from a menu, the operator may assign a high relevance (weighing factor) to the number of steering wheel actuations in order to choose a route that includes primarily straight roads instead of a route that includes many turns.

Because, in this example, the operator indicated a desired drive time of 9:00 a.m. for the fourth drive, only the traffic data sets 1 and 2 of the first and second drive are selected and compared. In contrast, if the operator does not specify a drive time for the fourth drive in step 541, the computer may compare all traffic data sets to determine the optimal route independent of the time of driving.

Because each of the driving data sets differ from each other in terms of the drive time, the optimal route may be determined by the computer based on the day time. This may be of advantage when the optimal route depends strongly on the occurrence of traffic jams during the rush hour, for example.

Figure 6:
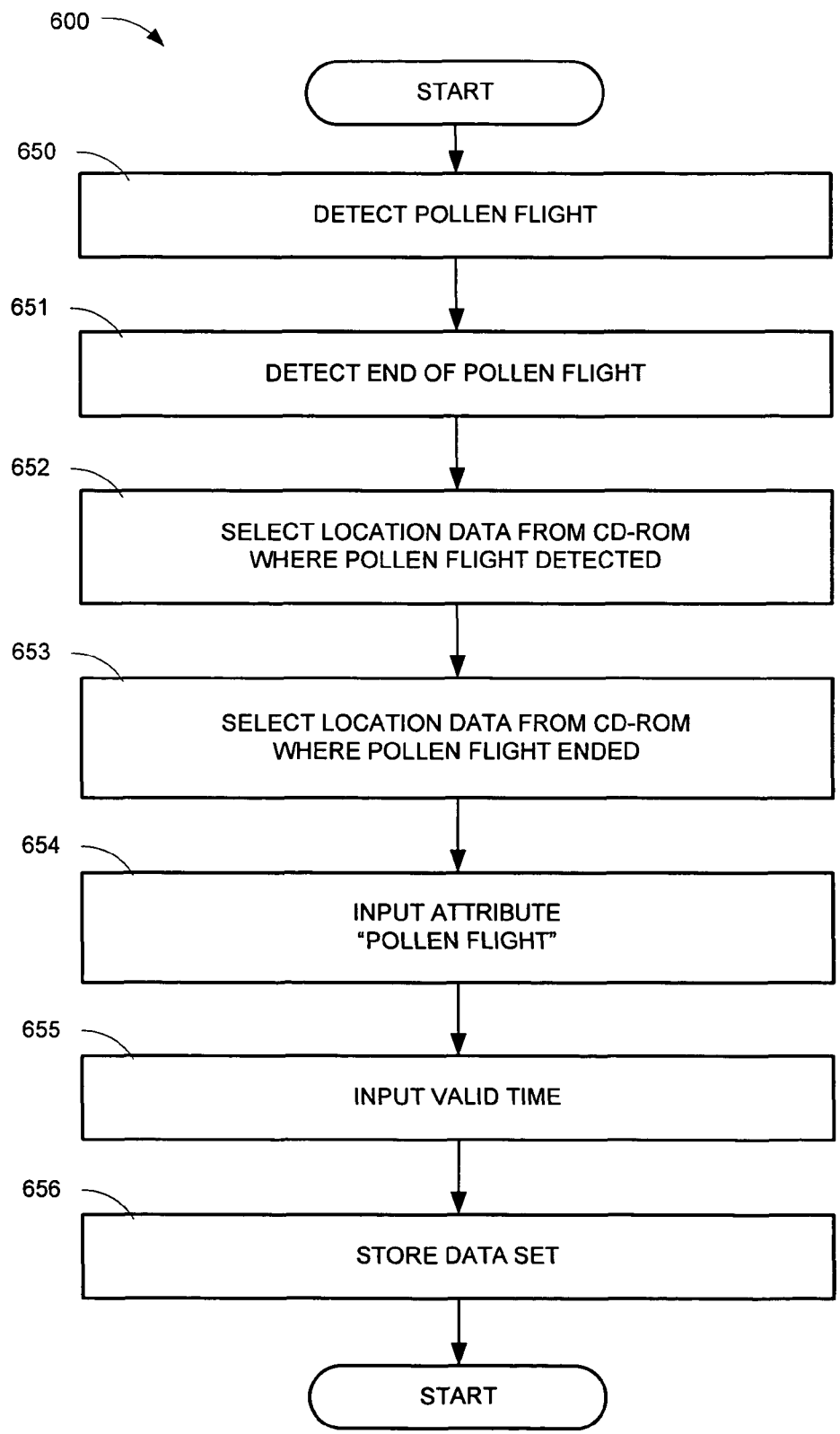
FIG. 6 is a flow chart of another method for generating traffic data for the vehicle shown in FIG. 1.

An example of a method for generating traffic data by an operator is shown in FIG. 6. This example will be explained with reference to FIGS. 1 and 7, as well as FIG. 6. In the example of FIG. 6, the method 600 determines an optimal route based on the attribute pollen count. In this example, the operator is again traversing the distance between starting point A and the destination point B (see FIG. 1). The operator may detect the presence of pollen count 650 in the air due to an allergic reaction of his immune system at point F (see FIG. 1). At point G, the operator detects that there is no more pollen count present in the air. The operator makes a mental note of the location at which the operator first detected the pollen count, and at which the operated ceased to detect pollen count.

After the drive, the operator may edit the data of the computer by selecting the location at which the operator first detected the pollen count (point F) 652 and the location at which the operator noticed the end of pollen count (point G) 653, from digital map data stored on, for example, a CD-ROM that includes location data of the respective traffic area. The operator may then input the attribute "pollen count" 654 into the computer. Thereby, the attribute "pollen count" is allocated to the location data related to the portion of road from point F to point G by the operator. The respective distance from point F to point G may be determined by the processor 742 and communicated on the display 704 (see FIG. 7) so that it may be easily checked by the operator to correspond to the section of the route where the operator detected the pollen count.

If the section of road between point F and point G includes intersections, it may be useful for the operator to specify the distance between point F and point G in more detail by selecting further location data from the digital map data. Furthermore, the operator may input a time period during which the pollen count occurs, according to his preference, to define a time period during which the attribute "pollen count" is valid 655. This time period may include, from April until June.

The generated traffic data set may then be stored 656 in the storage, and may include the attribute pollen count, the duration or valid time of from April to June, and the road section from point F to G The traffic data may be used for navigation purposes or for communicating a warning, for example as described in connection with FIGS. 3 and 4.

The methods described in this document are not limited to the particular examples presented above. In particular, the different modes of detecting the attribute, generating the attribute and data, and communicating the traffic data to the operator may be combined in any suitable manner. For example, the traffic data relating to the attribute "Speed limit" may be used for navigation purposes (input: e.g. avoid roads including "SPEED LIMIT 80 KM/H"), as well to communicate warnings as described in connection with FIG. 3.

An example of a system for providing traffic data to an operator is shown in FIG. 7. The system 700 may include a computer 701 mounted inside the vehicle to which an input device 702, a CD-ROM drive 703, a display 704, a GPS unit 705, a telematic unit 706, a radio unit 707 and/or multiple sensors 710-720 are in communication.

The input device 702 for entering attributes may include a keyboard 750, a microphone 754 and/or a speech recognition unit 752 for translating the input of the operator via microphone 754. The input device 702 is used for inputting attributes and may be adapted to operate the radio unit 707 and the telematic unit 706.

A CD including road map data of the area may be inserted into a CD-ROM drive 703. The CD may include data relating to towns, villages, streets, street numbers, and the like, for example, of Germany. The CD-ROM drive 703 may include a disk changer 765 for receiving a plurality of CDs or DVDs containing road maps of e.g. different countries. A display 704 is provided for visually displaying the digital road maps on which the route determined by the navigation unit 740 of the computer 701 may be superimposed. Furthermore, the attributes input via the input device 702 and information received or sent via the telematic unit 706 or the radio unit 707 or a warning to the operator may be displayed on the display 704.

A radio unit 707 including a car radio 760 and an amplifier 762 is provided for receiving VHF, MF, LF and HF transmission and includes a radio data system ("RDS") module 763 for performing an RDS function in connection with a traffic message channel ("TMC") function. The radio unit 707 receives information data from, e.g., broadcasting services via a radio transmitter 730 by a receiving antenna (not shown). The RDS/TMC data received by the RDS module 763 from the radio transmitter 730 is automatically processed by the data processor 742 of the computer 701 without being selected or input by the operator.

The radio unit 707 and the CD-ROM drive 703 are disposed in a housing 708. A set of one or more speakers 709 may be in communication with the radio unit 707. The speakers 709 may be temporarily switched to microphone mode, so that the speaker 709 may be used as a microphone, e.g., in wireless mode.

A telematic unit 706 may include a wireless telephone 770 including a GSM-module 772 for wireless communication which is preferably activated by a GSM-card and a card reader (not shown). Alternatively, a default pin permanently set in the factory may be used or the pin may be set automatically when the GSM card is inserted into the GSM module 772.

The GSM module 772 with which the transmitting/receiving antennas 774 are in communication provide a communication link with an external GSM station 731. The wireless telephone 770 may include a headset 776 and the telematic unit 706 includes a text-to-speech unit 778 for communicating the received GSM signals acoustically by speech output via the speakers 709. In addition to the headphones 776, information may be input into the telematic unit 706 using the input device 702, including the keyboard 750 and/or the microphone 754. The telematic unit 706 may provide a bi-directional communication placing an operator in communication with any other person or an external station.

The operator may receive a traffic information and respective position data of the traffic information via the telematic unit 706. The operator may enter traffic information together and position data into the computer via the input device 702. The operator may send traffic information with the respective location data to an external station where the generated traffic data is stored. The route to a destination as entered by the operator may then be calculated and retransmitted to the operator who sent the information or to any other operator. In this case, headset 776 of the telematic unit 706 may be used as input device for inputting traffic information according to the method of the invention. The traffic data retransmitted and communicated to the operator include the calculated route and driving recommendations which are communicated sequentially in dependence on the position of the vehicle 101 (see FIG. 1) as determined by the GPS unit and the optimal route determined based on the generated traffic data.

The GPS unit 705 includes transmitting/receiving antennas 746 for receiving GPS signals from a plurality of GPS satellites 732. The GPS unit 705 is in communication with the telematic unit 706 so that the position data of the vehicle may be sent to an external station via the transmitting/receiving antennas 746.

The computer 701 may include a navigation unit 740 for determining an optimal route and communicating driving recommendations via the display 704 or the speakers 709. An engine management system 741 of the computer 701 may be provided for controlling the engine and/or power train of the vehicle 101 (see FIG. 1) in response to the generated traffic data.

The computer 701 may be in communication with an ignition lock 722 so that sensors 710-720 may be automatically started after starting the engine. The system of FIG. 7 may include a plurality of sensors including a wheel sensor 710 for measuring the rotational speed, a gyroscope 711, a digital photo/video camera 712, a speedometer 713, a humidity sensor 714, a temperature sensor 715, an angle sensor 716 of the steering wheel, a brake pedal sensor 717 for sensing the actuation of the brake pedal, a gas pedal sensor 718 for sensing the actuation of the gas pedal, a fuel sensor 719 for measuring the fuel consumption of the vehicle, a clock or time sensor 720, other speed sensors, a throttle position sensor, and the like.

The sensors 710-720 detect driving data of the vehicle along a predetermined driving distance. The detected driving data is allocated by the operator to location data read from the CD-ROM inserted in the CD-ROM drive 703 or to position data of the vehicle as detected by the GPS unit 705. The generated traffic data may then be processed and stored in a storage device 743 of the computer by a data processor 742. The processor 742 may be capable of performing any data processing function desired. Furthermore, the processing may include converting of the traffic data to a data format suitable to be communicated to the operator via the display 704 or the speakers 709. A menu driven software program is installed on the computer for facilitating the input and/or selection operation of the attribute by the operator.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for communicating traffic data to an operator of a vehicle, comprising:
   providing geographical location data of a vehicle to a computer-based system;
   allocating data relating to an attribute detected by an operator of the vehicle with the geographical location data to generate traffic data;
   storing the traffic data; and
   communicating the traffic data, which includes the geographical location data and the allocated data relating to the attribute, to the operator of the vehicle.

2. The method of claim 1, where the traffic data is further generated by a computer-based system.

3. The method of claim 2, where the traffic data is further generated by the computer-based system using an operator-assigned weighting factor.

4. The method of claim 2, where the traffic data is further generated by the computer-based system based on a position of the vehicle.

5. The method of claim 2, where the traffic data is further generated by the computer-based system in response to a destination indicated by the operator.

6. The method of claim 1, where the geographical location data includes map data.

7. The method of claim 1, where the geographical location data includes vehicle position data.

8. The method of claim 1, where the data relating to the attribute is allocated with the geographical location data automatically after the vehicle has started.

9. The method of claim 1, where the attribute data is allocated by selecting the attribute from a plurality of attributes that are stored in the computer-based system.

10. The method of claim 1, where the traffic data is generated after motion of the vehicle.

11. The method of claim 1, where the traffic data is automatically stored when the vehicle has started.

12. The method of claim 1, where the traffic data is communicated based on data indicating a position of the vehicle.

13. The method of claim 1, where the traffic data is communicated to a user in response to entering a destination.

14. The method of claim 1, where the traffic data communicated to the operator includes a time period during which the traffic data is valid.

15. The method of claim 1, where the data communicated to the operator includes an indication that the data includes user-generated traffic data.

16. The method of claim 1, further comprising generating the data relating to the attribute by entering the attribute into the computer-based system.

17. The method of claim 16, where the attribute is entered into the computer-based system automatically when the vehicle has started.

18. The method of claim 16, where the attribute is entered into the computer-based system by the operator of the vehicle.

19. The method of claim 16, where the attribute is detected by a sensor in communication with the vehicle.

20. The method of claim 19, where the attribute is detected by a sensor continuously.

21. The method of claim 16, where the attribute is detected continuously when the vehicle is in motion.

22. The method of claim 16, where the attribute includes an attribute detected by the operator during a first trip along a path, and where the attribute is stored for communication to the operator during a second trip along the path.

23. The method of claim 16, where the attribute is related to at least one of a location, a street, a route, and an area.

24. The method of claim 16, where the attribute describes an environmental condition of at least one of a location, a street, and an area.

25. The method of claim 16, where the attribute includes at least one of a data type indicating a speed of the vehicle, an acceleration of the vehicle, a speed limit, a building site, a pollen count, an illumination, a smog indication, an environmental condition, a weather condition, and an indication of street crime.

26. The method of claim 16, where the attribute is entered by the operator.

27. The method of claim 16, where the attribute includes driving data relating to the vehicle.

28. The method of claim 27, where the driving data includes data indicating a drive time of the vehicle.

29. The method of claim 27, where the driving data includes data indicating a fuel consumption of the vehicle.

30. The method of claim 1, further comprising communicating the traffic data to a second operator.

31. The method of claim 1, further comprising determining a route based on the traffic data.

32. The method of claim 31, where the route is further determined based on a criterion indicated by the operator.

33. The method of claim 31, further comprising routing the operator based on the traffic data.

34. The method of claim 33, where routing the operator is further based on a criterion indicated by the operator.

35. The method of claim 34, where the criterion is based on a pollen count.

36. The method of claim 34, where the criterion is based on a drive time of the vehicle.

37. The method of claim 34, where the criterion is based on a fuel consumption of the vehicle.

38. The method of claim 1, further comprising communicating a warning to the operator when a preset condition is met.

39. The method of claim 1, further comprising receiving additional traffic data from an external information source, and processing the additional traffic data with the traffic data for communication to the operator.

40. The method of claim 1, further comprising receiving additional traffic data from a local storage device, and processing the additional traffic data with the traffic data for communication to the operator.

41. A computer-based system for providing traffic data to an operator of a vehicle comprising:
a provider configured to receive location data of a vehicle;
an allocation module configured to allocate attribute data detected by a vehicle operator at the vehicle to a subset of the location data for use in generating traffic data;
a storage medium configured to store the attribute and the traffic data; and
an output device configured to communicate the traffic data, which includes the subset of the location data and the allocated attribute data, to the vehicle operator.

42. The system of claim 41, further comprising a selector configured to select data relating to the attribute.

43. The system of claim 41, further comprising a data generator configured to generate data relating to the attribute.

44. The system of claim 43, further comprising a sensor configured to detect data relating to the attribute.

45. The system of claim 41, where the detector includes a sensor configured to measure at least one of a time, day time, driving direction, driving velocity, temperature, humidity, intensity of light, fuel consumption, acceleration of the vehicle, vehicle noise, ambient noise, and deceleration of the vehicle.

46. The system of claim 41, where the provider includes a receiver configured to receive position data of the vehicle.

47. The system of claim 41, further comprising a telematic unit configured to receive further data from an external source.

48. The system of claim 47, where the telematic unit is further configured to transmit the traffic data to an external source.

49. A computer-based system for providing traffic data to an operator of a vehicle comprising:
a means for providing location data of a vehicle;
a means for detecting attribute data by an operator of the vehicle;
a means for allocating the attribute data with the location data;
a means for storing traffic data comprising the location data and the allocated attribute data; and
a means for communicating the traffic data to the operator of the vehicle.

50. A navigation system comprising:
a provider configured to provide location data of a vehicle;
an allocation module configured to allocate attribute data detected by an operator of the vehicle to a subset of the location data for use in generating traffic data;
a storage medium configured to store the attribute and the traffic data; and
an output device configured to communicate the traffic data, which includes the subset of the location data and the allocated attribute data, to the operator of the vehicle.

51. A navigation system comprising:
a means for providing location data of a traffic area;
a means for detecting attribute data by an operator of a vehicle;
a means for allocating the attribute data;
a means for storing traffic data comprising the location data and the allocated attribute data; and
a means for communicating the traffic data to the operator of the vehicle.

* * * * *

UNITED STATES PATENT AND TRADEMARK OFFICE
CERTIFICATE OF CORRECTION

| | |
|---|---|
| PATENT NO. | : 7,822,538 B2 |
| APPLICATION NO. | : 10/912867 |
| DATED | : October 26, 2010 |
| INVENTOR(S) | : Hovestadt et al. |

It is certified that error appears in the above-identified patent and that said Letters Patent is hereby corrected as shown below:

At column 2, line 6, "...attribute data a subset..." should be changed to "...attribute data to a subset..."

At column 3, line 23, "attribute data indirectly using..." should be changed to "attribute data using..."

At column 4, line 51,". ..to the operator in." should be changed to "...to the operator in"

At column 6, line 21, "multiple of locations..." should be changed to "multiple locations..."
At column 6, line 44, "...in memory. The computer..." should be changed to "...in memory step 219. The computer..."
At column 6, line 62, "An example of a method for..." should be changed to "An example of a method 300 for..."

At column 7, line 7, "...the position data detected..." should be changed to "...the position data 322 detected..."
At column 7, line 10, "...may be communicated 325..." should be changed to"... may be communicated 323..."
At column 7, line 45, "...example of a system for..." should be changed to "...example of a method for..."

At column 8, line 7, "stored in the storage device..." should be changed to "stored 439 in the storage device..."
At column 8, line 40, "example of a method for..." should be changed to "example of a method 500 for..."
At column 8, line 47, "...inputs the final destination..." should be changed to "...inputs 541 the final destination..."
At column 8, line 59, "...communicate route B..." should be changed to "...communicate route B 544..."
At column 8, line 65, "of the computer 700..." should be changed to "of the computer 701..."

Signed and Sealed this
Eighth Day of March, 2011

David J. Kappos
*Director of the United States Patent and Trademark Office*

CERTIFICATE OF CORRECTION (continued)

U.S. Pat. No. 7,822,538 B2

At column 9, line 38, "...the operator detects that..." should be changed to "...the operator detects 651 that..."

At column 11, line 2, "...the headphones 776," should be changed to "...the headset 776,"